United States Patent [19]
Kline

[11] 3,789,133
[45] Jan. 29, 1974

[54] TELEVISION CAMERA APERTURE CORRECTION SYSTEM

[75] Inventor: Donald D. Kline, Palo Alto, Calif.

[73] Assignee: Commercial Electronics, Inc., Mountain View, Calif.

[22] Filed: Oct. 26, 1971

[21] Appl. No.: 192,259

[52] U.S. Cl. .......... 178/5.4 R, 178/DIG. 25
[51] Int. Cl. .......... H04n 9/02
[58] Field of Search .......... 178/DIG. 25, 5.4 R, 7.1

[56] References Cited

UNITED STATES PATENTS

| | | | |
|---|---|---|---|
| 3,681,520 | 8/1972 | Schneider | 178/DIG. 25 |
| 3,011,018 | 11/1961 | Sullivan | 178/DIG. 25 |
| 2,971,053 | 2/1961 | Gibson | 178/DIG. 25 |
| 3,536,826 | 10/1970 | McMann, Jr. | 178/DIG. 25 |

FOREIGN PATENTS OR APPLICATIONS

| | | | |
|---|---|---|---|
| 2,048,851 | 5/1971 | Germany | 178/DIG. 25 |

*Primary Examiner*—Richard Murray
*Attorney, Agent, or Firm*—Townsend & Townsend

[57] ABSTRACT

A television camera aperture correction system wherein the video signal is applied to a low pass filter. The filtered video signal is substracted from the original video signal, which has been suitably delayed by a delay line to produce a contour signal containing primarily high frequency video signal components. The contour signal is amplified and the low level portion of the contour signal, which is primarily high frequency noise, is removed by a coring circuit. Thereafter the cored contour signal is combined with the filtered video signal to produce a resultant video signal having enhanced high frequency components, but without the attendant high frequency noise increase conventionally associated therewith.

24 Claims, 5 Drawing Figures

TELEVISION CAMERA APERTURE CORRECTION SYSTEM

This invention relates to a television camera aperture correction system.

In television systems, sharp edges or transitions are often reproduced with a distinct lack of sharpness or definition. The primary cause of such loss of sharpness is in the television camera, wherein the finite spot size of the television camera tube causes a blurring of these edges or transitions, which may be regarded as a lack of high frequency response in the television camera tube.

In order to compensate for this phenomena, the prior art has employed techniques referred to as aperture correction, wherein the high frequency components of the television signal produced by the camera tube are enhanced. Unfortunately, such high frequency signals typically include a substantial amount of noise, so that while their enhancement will appear to improve the sharpness or definition of edges and transitions, an undue amount of noise is introduced into the picture.

According to the present invention, there is provided a television camera aperture correction system wherein the high frequency noise present in the television signal is substantially minimized. This is accomplished according to the present invention by applying the video signal to a low pass filter. The output of the low pass filter is then subtracted from the original video signal, which has been suitably delayed by a delay line to be in phase with the signal produced by the low pass filter, to produce a contour signal containing predominantly high frequency video signal components. The contour signal is amplified and the low level portion of the contour signal, which is primarily high frequency noise signals, is removed by a coring circuit. Thereafter, the cored contour signal is combined with the output of the low pass filter to produce a resultant video signal having enhanced high frequency components, but without the attendant high frequency noise increase conventionally associated therewith.

Accordingly, it is an object of the present invention to provide a television camera aperture correction system which enhances the high frequency components of the video signal while minimizing high frequency noise.

Another object of the present invention is to provide a television camera aperture correction system wherein a contour signal containing the high frequency components of the video signal is produced by differencing the output of a low pass filter and a delay line.

Still another object of the present invention is to provide a television camera aperture correction system wherein the contour signal is cored to minimize high frequency noise signals.

The television aperture correction system according to the present invention is advantageous in that the enhancement of the high frequency components of the video signals results in a substantial improvement in the sharpness or definition of sharp edges or transitions, while minimizing high frequency noise. Moreover, the television camera aperture correction system according to the present invention is highly effective and is also simple, reliable and inexpensive.

These and other objects, features and advantages of the present invention will be more readily apparent from the following detailed description, wherein reference is made to the accompanying drawings, in which.

Figure 1:
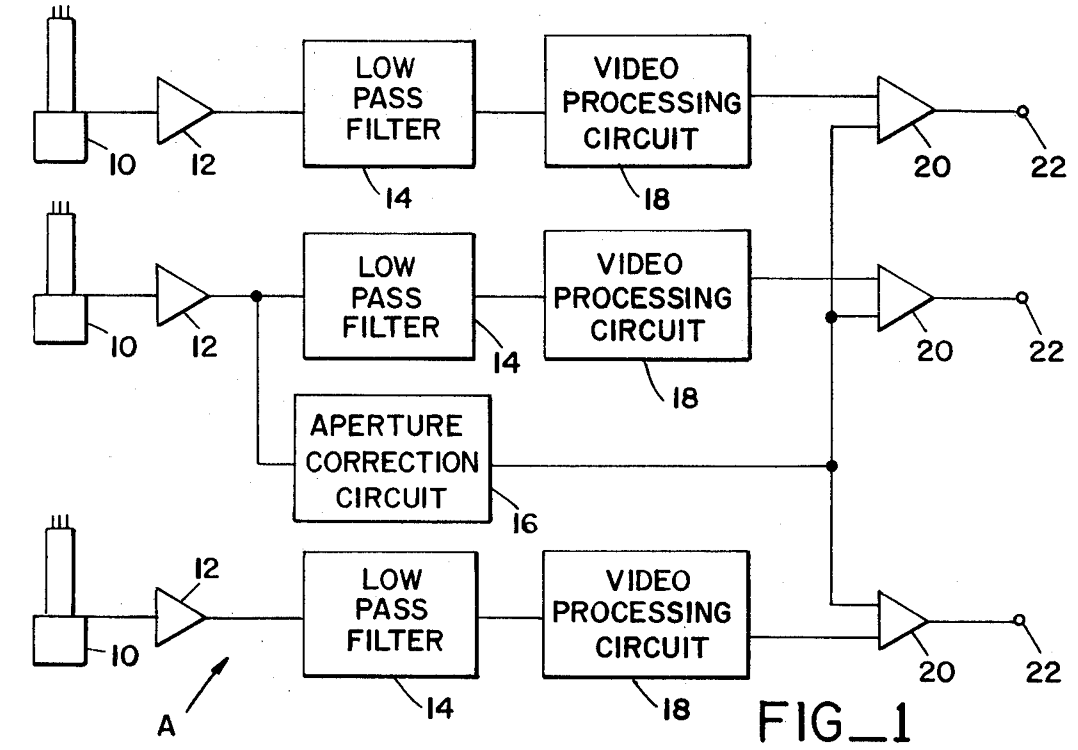
FIG. 1 is a block diagram of a color television camera employing the aperture correction system according to an embodiment of the present invention.

Referring initially to FIG. 1, there is depicted a color television camera A employing an aperture correction system according to an embodiment of the present invention. Specifically, there are provided three television camera tubes 10. Varying spectral portions of an optical image are imaged on the respective tubes 10 by a lens and filter system (not shown). The outputs or targets of the camera tubes are respectively connected to the inputs of three preamplifiers 12, which function in a conventional manner.

The preamplified video signals at the output of preamplifiers 12 are respectively applied to the inputs of three low pass filters 14. Low pass filters 14 typically have an upper corner frequency of approximately 2 to 2.5 mHz, so that the substantial portion of the video signals beneath the corner frequency will pass therethrough unimpeded, but, of course, somewhat delayed. Applicant has found that it is preferable to employ linear phase low pass filters for filters 14, in order to avoid phase distortion of the video signals.

The output of at least one of the preamplifiers 12 is also applied to an aperture correction circuit 16. As will be described in greater detail hereinafter, aperture correction circuit 16 functions to select and amplify the high frequency components of the video signal applied thereto, thereby forming a contour signal. In addition, the aperture correction circuit may include circuitry adapted to remove the low level, high frequency noise signals from the video signal, in a manner to be described in greater detail hereinafter.

The outputs of low pass filters 14 are respectively connected to the input of three video processing circuits 18. Video processing circuits 18 comprise conventional video processing circuitry, as for example, gamma correction and color matrixing circuitry. This, according to the present invention, only the low frequency components of the video signals produced by the camera tubes need be processed by video processing circuits 18. Of course, if desired, video processing circuits 18 may be disposed elsewhere in the circuitry to effect processing of the composite video signals.

The outputs of video processing circuits 18 are respectively connected to the inputs of three summing amplifiers 20. The other inputs of summing amplifiers 20 are connected to the output of aperture correction circuit 16. Thus, both the low frequency video signals from video processing circuit 18 and the amplified high frequency video signals from aperture correction circuit 16 will be applied to each of the summing amplifiers 20. Accordingly, the output of summing amplifiers 20 will comprise a resultant or composite video signal having amplified or enhanced high frequency components. These video signals are respectively connected to three output terminals 22, which represent the outputs of the television camera according to the present invention.

It is thus apparent that in accordance with an embodiment of the present invention, the high frequency components of the video signal produced by a single one of the camera tubes 10 are enhanced and applied to all three of the video channels. Applicant has found it preferable to employ the high frequency components of the video signal associated with the green camera tube 10, as the green video channel generally contains greater high frequency information than the other video channels. Furthermore, applicant has found that by coupling the high frequency components of the green video signal to the other video signals, no appreciable degradation in color effect is obtained. Thus, the present invention simplifies the color television camera circuitry, by requiring aperture correction circuitry for only one of the video signals.

Alternatively, aperture correction circuitry according to the present invention may be provided for all of the video signals. Specifically, three aperture correction circuits 16 may be provided, one for each video signal. The output of each aperture correction circuit would then be connected only to the input of the summing amplifier 20 of the respective channel associated therewith.

Figure 2:
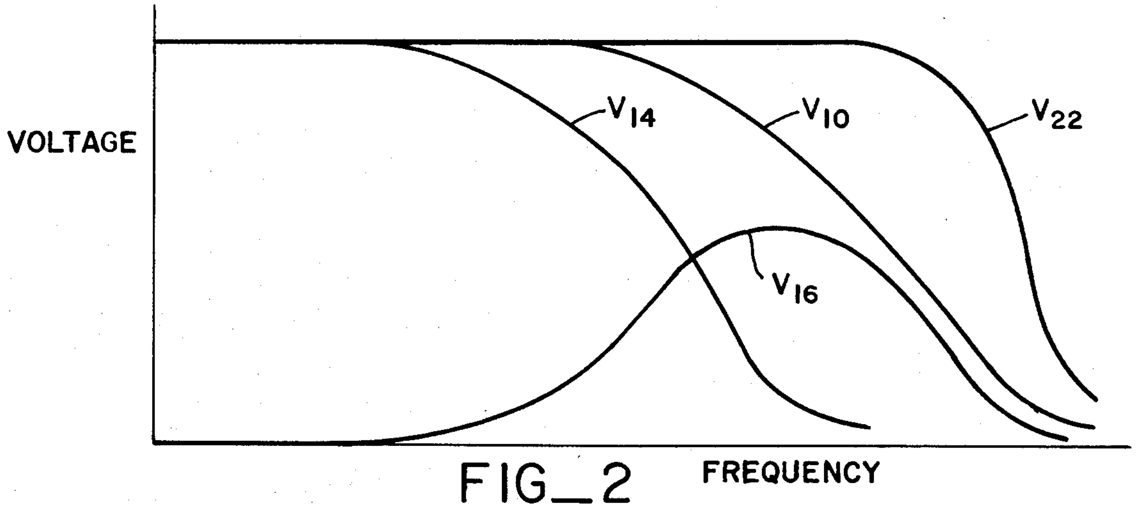
FIG. 2 is a graphic representation of the frequency response of signals of the apparatus depicted in FIG. 1.

Referring now to FIG. 2, the overall operation of the aperture correction system according to the present invention will now be described. Specifically, FIG. 2 depicts the frequency response of various signals of the circuitry depicted in FIG. 1. The frequency response of the camera tubes 10 is illustrated by the curve $V_{10}$. As is apparent therefrom, canera tubes 10 exhibit a high frequency roll off, primarily due to the finite spot size of the camera tube beam. It is thus desirable to enhance the high frequency signals produced by the camera tubes 10, as described hereinbefore.

The frequency response of the signals produced by the low pass filters 14 is illustrated in FIG. 2 as curve $V_{14}$. As is apparent therefrom, the signal produced by the low pass filters exhibits an attenuation of the high frequency signal components. Specifically, applicant has found it desirable to employ a corner frequency of 2 to 2.5 mHz.

The curve $V_{16}$ in FIG. 2 depicts the frequency response of the contour signal produced by the aperture correction circuit according to the present invention. As is apparent from FIG. 2, the contour signal $V_{16}$ contains primarily high frequency components. As will be more readily apparent hereinafter, this contour signal is produced by subtracting signal $V_{14}$ from signal $V_{10}$, or, in other words, by subtracting the output singal of the low pass filter from the original video signal. Contour signal $V_{16}$ may be amplified and added to either signal $V_{10}$ or $V_{14}$, to produce a composite signal $V_{22}$ having enhanced high frequency components. In other words, the contour signal may be amplified and added to either the filtered video signal or the original video signal, to produce the composite or resultant video signal $V_{22}$. However, in order to minimize high frequency noise, applicant has found it preferable to add the contour signal to the filtered video signal, as the filtered video signal will, of course, contain less high frequency noise. As is apparent from FIG. 2, the frequency response of $V_{22}$ remains essentially flat beyond the corner frequency of the camera signal $V_{10}$, thereby increasing the effective frequency response of the television camera as desired. Moreover, as will be more readily apparent hereinafter, the high frequency noise may further be minimized according to the present invention.

Figure 3:
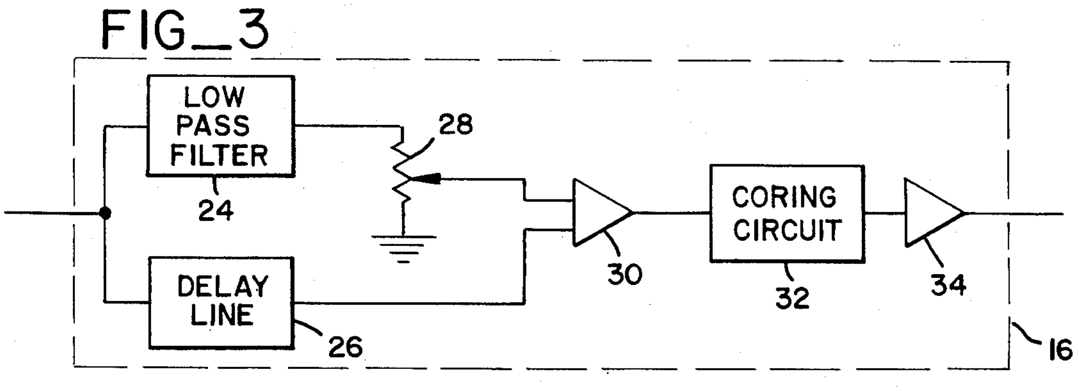
FIG. 3 is a block diagram of the aperture correction circuit of the apparatus depicted in FIG. 1.

Referring now to FIG. 3, the aperture correction circuit according to the present invention will now be described in detail. The video signal input to aperture correction circuit 16 is applied to a low pass filter 24 and a delay line 26. Low pass filter 24 is a linear phase low pass filter substantially identical to low pass filters 14 described hereinbefore. In fact, low pass filter 24 is not an essential element of aperture correction circuit 16, in that the output signal of low pass filter 14 may be applied to aperture correction circuit 16 in lieu thereof. Low pass filter 24 preferably has a high frequency corner at approximately 2 to 2 ½ mHz, so that the high frequency components of the video signal applied thereto will be substantially attenuated.

Delay line 26 has a delay characteristic similar to low pass filter 24, but, of course, passes all of the video signal applied thereto. Delay line 26 is thus employed to delay the video signal so that it will be in phase with the filtered video signal produced by the low pass filter 24.

The filtered video signal produced by the low pass filter 24 is applied, via potentiometer 28, to the input of a differential amplifier 30. The delayed video signal from delay line 26 is applied to the other input of differential amplifier 30. Thus, differential amplifier 30 functions to subtract the filtered or low frequency video signal from the delayed video signal, and thereby produce a contour signal primarily composed of high frequency video signal components. This signal may be employed as the contour signal of the television camera according to the present invention.

However, as an additional aspect of the present invention, the high frequency noise components of the contour signal may be attenuated to achieve an overall reduction in the high frequency noise level of the camera. To this end, the output of differential amplifier 30 is connected to a coring circuit 32. Coring circuit 32 functions to attenuate signals below a predetermined amplitude, while amplifying signals above that predetermined amplitude. Applicant has found that high frequency noise signals are generally of a lower amplitude than high frequency information signals. Accordingly, by having the predetermined coring amplitude of coring circuit 32 correspond to a value slightly greater than the expected high frequency noise level, a substantial amount of high frequency noise will be eliminated from the contour signal, with little effect upon the information content of the contour signal.

The output of coring circuit 32 is applied to the input of an amplifier 34. Amplifier 34 functions to amplify the contour signal to a level sufficient to produce the desired enhancement of high frequency components of the video signal, when the contour signal is recombined with the video signal, as described in greater detail hereinbefore. Accordingly, aperture correction circuit 16 functions to produce a contour signal or video signal of amplified or enhanced high frequency components, wherein the noise level is substantially minimized.

Figures 4, 5:
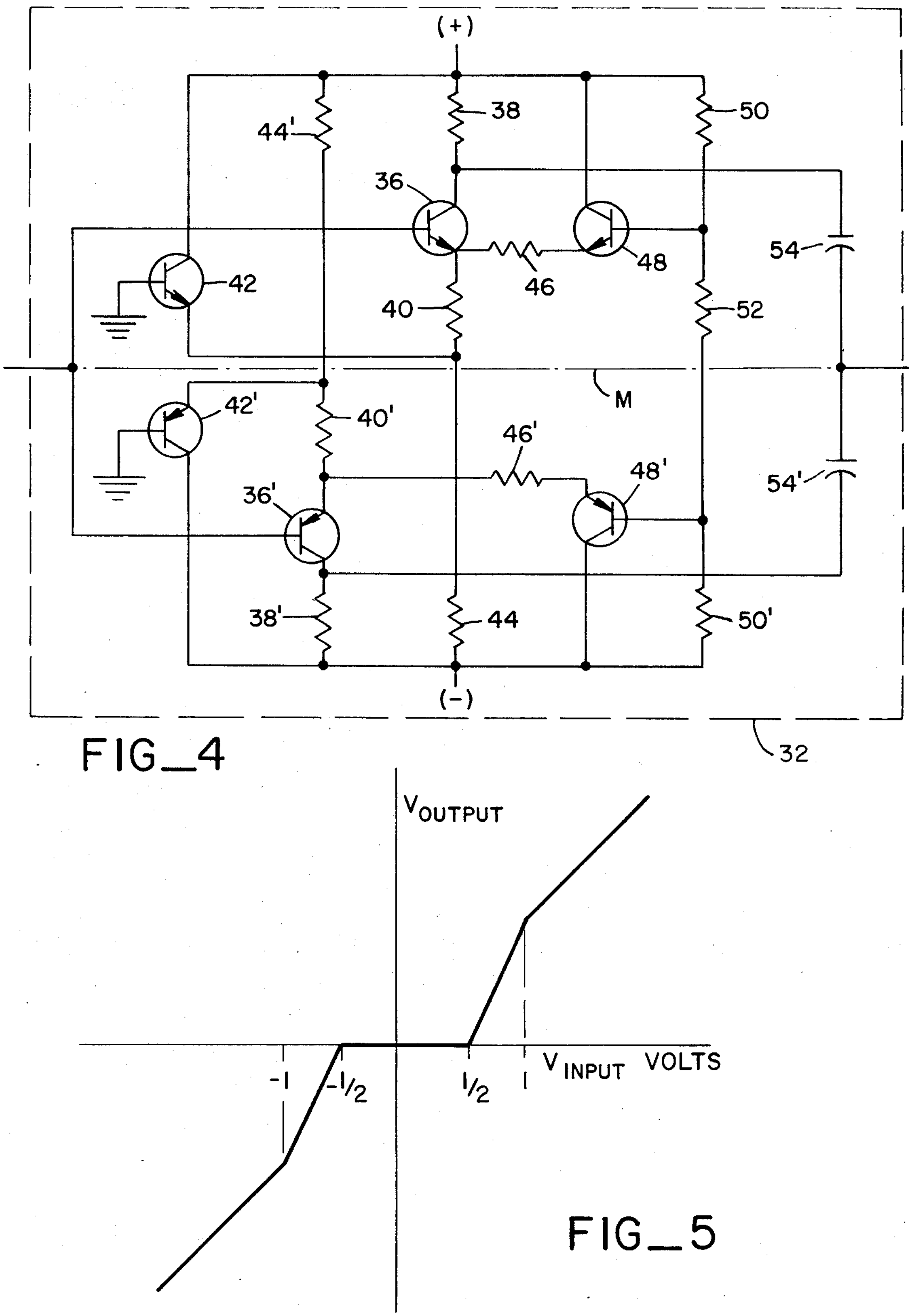
FIG. 4 is a schematic diagram of the coring circuit depicted in FIG. 3.
FIG. 5 is a graphic representation of the voltage transfer characteristics of the coring circuit depicted in FIG. 4.

Referring now to FIGS. 4 and 5, coring circuit 32 will now be described in detail. Coring circuit 32 is substantially symmetrical about its midline M, the upper portion operating upon positive input signals and the lower portion operating upon negative input signals. Thus, only the upper portion of coring circuit 32 will be described in detail, and similar components of the lower portion of coring circuit 32 have been given the same reference number as the corresponding component in the upper portion, with the addition of a prime designation.

The input signal to coring circuit 32 is applied to the base of a transistor 36. Transistor 36 is connected in a common emitter configuration, with a resistor 38 functioning as a collector load resistor and a resistor 40 functioning as an emitter resistor. Resistor 40 is connected to the junction of the emitter of a transistor 42 and a resistor 44. Transistor 42 and resistor 44 function to bias the emitter of transistor 36 to one transistor junction voltage below ground level, in order to overcome the junction voltage of transistor 36, and thus render transistor 36 responsive to signals above ground level without regard to its junction voltage.

The emitter of transistor 36 is connected, via a resistor 46, to the emitter of a transistor 48. The collector of transistor 48 is connected to the positive supply voltage and the base of transistor 48 is biased to a particular voltage by a series circuit of resistors 50, 52 and 50'.

The voltage thus supplied to the base of transistor 48 biases transistor 48 into a conducting state. A portion of the voltage on the emitter of transistor 48 will be applied to the emitter of transistor 36, via resistor 46. Specifically, resistors 46 and 40 form a voltage divider which determines the voltage applied to the emitter of transistor 36. Due to this bias voltage on the emitter of transistor 36, transistor 36 will initially be non-conducting. The application of a small input signal to the base of transistor 36, that is, an input signal less than the voltage at the emitter of transistor 36, will produce no effect, as it will not overcome this bias condition.

When the input signal applied to the base of transistor 36 is greater than the bias voltage applied to the emitter of transistor 36, transistor 36 will conduct. Resistors 40 and 46 will effectively be in parallel, so that the gain of transistor 36 will be determined by the ratio between the parallel combination of resistors 40 and 46 and load resistor 38. An output signal will thus be produced at the collector of transistor 36, which will be coupled, via a capacitor 54, to the output of the coring circuit.

For input signals of greater magnitude, the bias imposed upon transistor 36 by transistor 48 will be overcome, thereby causing transistor 48 to assume a non-conducting state or be turned off. This effectively removes resistor 46 from the emitter circuit of transistor 36, so that the gain of transistor 36 will then be determined by the ratio between emitter resistor 40 and load resistor 38. This gain will then be somewhat less than the gain achieved for smaller signals.

Accordingly, the voltage transfer characteristics of the coring circuit 32 possess three distinct regions. First, for small input signals, no output signal will be produced. Secondly, for somewhat greater input signals, the circuit will display a first level of gain. Thirdly, for large input signals, this circuit will display a second level of gain, the second level of gain being less than the first level of gain.

It is a feature of the particular coring circuit 32 thus described, that for large input signals, that is, signals sufficiently large to cause the circuit to operate in the second or lower gain region, the output amplitude is unaffected. Thus, no appreciable amplitude distortion of the high frequency information signals occurs due to the coring action. Accordingly, applicant has found it desirable to employ a coring circuit of this type to minimize amplitude distortion of the video signals.

The foregoing may best be understood by way of example. For the purposes of this example, it shall be assumed that resistors 40 and 46 are of equal value, and resistors 50, 52 and 50' cooperate to apply +1 volt to the base of transistor 48.

Since resistors 40 and 46 are of equal value, they will cooperate to bias the emitter of transistor 36 to ±½ volt. For input signals less than +½ volt, transistor 36 will remain off or non-conducting, so that no output signal will be produced. For input signals greater than one-half volt, but less than 1 volt, resistors 40 and 46 may be regarded as being in parallel, so that a particular gain will be imparted to the signal applied to the coring circuit 32. When the input signal exceeds +1 volt, transistor 48 will be turned off, or caused to assume a non-conducting state, thereby removing resistor 46 from the circuit. The gain now imparted to the input signal will be one-half of the previous gain, since the effective emitter resistance has been halved.

The foregoing is graphically depicted in FIG. 5, wherein the voltage transfer characteristics of coring circuit 32 are depicted. As is apparent from FIG. 5, for input signals less than one-half volt, no output signal is produced. For input signals in the region between one-half volt and 1 volt, a particular gain is imparted thereto. For input signals greater than 1 volt, a gain of one-half the previous gain is applied thereto. Thus, small input signals will not be amplified, whereas large input signals will be amplified. Accordingly, the low level high frequency noise signals will be substantially eliminated, while the high level high frequency information signals will be amplified as desired.

It is also apparent from FIG. 5 that if the transfer function for the region greater than 1 volt was extended between +1 and −1 volt, it would pass through the origin. Thus, the amplitude of signals exceeding ±1 volt is unaffected by the coring action afforded to smaller signals.

It is further apparent that the particular gains in the various regions of the voltage transfer characteristics of coring circuit 32 are determined by the specific values of the resistances. Specifically, the overall coring level may be changed by varying one or more of the resistors 50, 52 or 50'. Moreover, by varying the value of resistor 46 with respect to resistor 40, the intermediate region of the voltage transfer characteristics of the coring circuit 32 may be altered. Specifically, as resistor 46 is decreased in value, the slope of the intermediate portion will rise. In the limiting case, wherein resistor 46 is zero ohms or a short, no voltage output will be produced until transistor 48 is biased into non-conduction. Thus, there will be no intermediate region in the voltage transfer characteristics curve. Applicant has found it somewhat desirable to employ a resistor 46, as otherwise the abrupt transition between the first and third regions of the voltage transfer characteristics curve is unduly sensitive and thus subject to the introduction of noise. Applicant has thus found the values employed in the numerical example to be preferable.

Of course, all of the components depicted in FIG. 4 and given a primed reference number operate in an identical manner, but for negative input signals.

It is thus apparent that the aperture correction system according to the present invention, when employed with a coring circuit 32, results in a minimization of high frequency noise, while enhancing the high frequency information signals in the desired manner. Applicant has found the aperture correction according to the present invention to be reliable and highly effective, thereby achieving an improvement in the overall frequency response of the television camera and a decrease in the overall noise level thereof. Thus, the television camera according to the present invention produces high quality television images with sharp and distinct transitions and edges, while maintaining a low noise level.

While a particular embodiment of the present invention has been shown and described in detail, adaptations and modifications will be apparent to one skilled in the art. Specifically, as hereinbefore described, a single aperture correction circuit may be employed in a color television camera, the video signal of one channel being applied thereto, and the output thereof being coupled to all three channels. Alternatively, three aperture correction circuits may be employed, one for each channel.

These and other adaptations and modifications of the present invention may be made without departing from the spirit and scope of the present invention, as set forth in the claims.

What is claimed is:

1. An aperture correction system for a video signal comprising a low pass filter, a delay line, said video signal being applied to said low pass filter and said delay line, subtraction means for subtracting the signal produced by said low pass filter from the signal produced by said delay line, amplifier means for amplifying the signal produced by said subtraction means and summing means for summing the signal produced by said amplifier means and the signal produced by said low pass filter.

2. Apparatus according to claim 1 wherein said low pass filter comprises a linear phase low pass filter and said delay line has a delay interval corresponding to the delay time of said low pass filter.

3. Apparatus according to claim 2 wherein said amplifier means includes coring means for attenuating the low level portion of the signal produced by said subtraction means.

4. Apparatus according to claim 3 wherein said coring means does not reduce the amplitude of the high level portion of the signal produced by said subtraction means.

5. An aperture correction system for a video signal comprising a low pass filter, a delay line, said video signal being applied to said low pass filter and said delay line, subtraction means for subtracting the signal produced by said low pass filter from the signal produced by said delay line, and summing means for summing the signal produced by said subtraction means and said video signal.

6. Apparatus according to claim 5 wherein said low pass filter comprises a linear phase low pass filter and said delay line has a delay interval corresponding to the delay time of said low pass filter.

7. Apparatus according to claim 6 further comprising coring means for attenuating the low level portion of the signal produced by said subtraction means.

8. Apparatus according to claim 7 wherein said coring means does not reduce the amplitude of the high level portion of the signal produced by said subtraction means.

9. In a color television camera having three camera tubes, lens means for optically imaging varying spectral portions of an image on said camera tubes and three preamplifiers respectively connected to the outputs of said camera tubes, the improvement comprising: three low pass filters respectively connected to the outputs of said preamplifiers, aperture correction means for producing a contour signal from the output signal of one of said preamplifiers and summing means for respectively summing the output signals produced by each of said low pass filters with said contour signal.

10. Apparatus according to claim 9 wherein said aperture correction means comprises a delay line connected to the output of said one preamplifier, subtraction means for subtracting the signal produced by the low pass filter associated with said one preamplifier from the signal produced by said delay line and amplifier means for amplifying the signal produced by said subtraction means to form said contour signal.

11. Apparatus according to claim 10 wherein said low pass filters comprise linear phase low pass filters and said delay line has a delay interval corresponding to the delay time of said low pass filters.

12. Apparatus according to claim 11 wherein said amplifier means includes coring means for attenuating the low level portion of the signal produced by said subtraction means.

13. Apparatus according to claim 12 wherein said coring means does not reduce the amplitude of the high level portion of the signal produced by said subtraction means.

14. In a color television camera having three camera tubes, lens means for optically imaging varying spectral portions of an image on said camera tubes and three preamplifiers respectively connected to the outputs of said camera tubes, the improvement comprising three low pass filters respectively connected to the outputs of said preamplifiers, three aperture correction circuits for producing contour signals from the respective output signals of said preamplifiers and summing means for summing each of said contour signals with the output signal produced by the respective low pass filter associated therewith.

15. Apparatus according to claim 14 wherein each of said aperture correction circuits comprises a delay line connected to said low pass filter, subtraction means for subtracting the signal produced by said low pass filter from the signal produced by said delay line, amplifier means for amplifying the signal produced by said subtraction means to form said contour signal.

16. Apparatus according to claim 15 wherein said low pass filter comprises a linear phase low pass filter and said delay line has a delay interval corresponding to the delay time of said low pass filter.

17. Apparatus according to claim 16 wherein said amplifier means includes coring means for attenuating the low level portion of the signal produced by said subtraction means.

18. Apparatus according to claim 17 wherein said coring means does not reduce the amplitude of the high level portion of the signal produced by said subtraction means.

19. A method of enhancing the high frequency components of a video signal comprising the steps of attenuating the high frequency components of said video signal, delaying said video signal to be in phase with the attenuated signal, subtracting the attenuated signal from the video signal to form a contour signal, amplifying said contour signal and summing the amplified contour signal and said attenuated signal.

20. The method according to claim 19 wherein the step of amplifying includes attenuating the low level portion of said contour signal.

21. The method according to claim 20 wherein the step of attenuating the low level portion of said contour signal is accomplished without reducing the amplitude of the high level portion of said contour signal.

22. A method of enhancing the high frequency components of a video signal comprising the steps of attenuating the high frequency components of said video signal, delaying said video signal to be in phase with the attenuated signal, subtracting the attenuated signal from the video signal to form a contour signal, and summing the contour signal and said video signal.

23. The method according to claim 22 comprising the step of attenuating the low level portion of said contour signal prior to said step of summing.

24. The method according to claim 23 wherein the step of attenuating the low level portion of said contour signal is accomplished without reducing the amplitude of the high level portion of said contour signal.

* * * * *